(12) United States Patent
Uttley et al.

(10) Patent No.: US 8,579,536 B2
(45) Date of Patent: Nov. 12, 2013

(54) METAL TO PLASTIC CONNECTOR FOR TOY STRUCTURES

(75) Inventors: Paul Uttley, Pittsburg, KS (US);
Stephan S. Turnipseed, Fitzpatrick, AL (US)

(73) Assignee: Lego A/S, Billund (DK)

( * ) Notice: Subject to any disclaimer, the term of this patent is extended or adjusted under 35 U.S.C. 154(b) by 0 days.

(21) Appl. No.: 13/548,040

(22) Filed: Jul. 12, 2012

(65) Prior Publication Data
US 2012/0282017 A1  Nov. 8, 2012

Related U.S. Application Data

(63) Continuation of application No. 12/082,984, filed on Apr. 16, 2008, now Pat. No. 8,240,939.

(51) Int. Cl.
*A63H 33/04* (2006.01)

(52) U.S. Cl.
USPC .......................................... 403/188; 446/122

(58) Field of Classification Search
USPC ............ 256/65.04, 65.05; 403/186, 188, 192, 403/199, 235, 384, 386; 248/534, 535, 539; 44/108, 111, 113, 118, 122, 123
See application file for complete search history.

(56) References Cited

U.S. PATENT DOCUMENTS

| 356,361 | A | 1/1887 | Godfrey |  |
|---|---|---|---|---|
| 1,056,576 | A | 3/1913 | Olson |  |
| 1,131,699 | A | 3/1915 | Hoecker et al. |  |
| 1,341,113 | A | 5/1920 | Dottl et al. |  |
| 1,522,751 | A * | 1/1925 | Sechler | 172/721 |
| 1,604,343 | A | 10/1926 | Greenwood |  |
| 1,820,661 | A * | 8/1931 | Gilbert | 446/113 |
| 2,149,781 | A * | 3/1939 | Leiser | 182/172 |
| 3,018,077 | A | 1/1962 | Buehler |  |
| 3,227,406 | A * | 1/1966 | Shelton et al. | 248/74.4 |
| 3,258,250 | A | 6/1966 | McMullin |  |
| 3,276,750 | A | 10/1966 | De Ridder |  |
| 3,292,886 | A * | 12/1966 | Rovinsky | 248/49 |
| 3,941,494 | A | 3/1976 | Ehlenbeck |  |
| 4,389,808 | A | 6/1983 | Podell et al. |  |
| 4,577,449 | A * | 3/1986 | Celli | 403/191 |
| 4,657,249 | A * | 4/1987 | Offutt | 473/485 |
| 4,830,341 | A | 5/1989 | Arteau et al. |  |
| 4,957,251 | A * | 9/1990 | Hubbard | 248/68.1 |
| 5,297,890 | A | 3/1994 | Commins |  |
| 6,053,281 | A * | 4/2000 | Murray | 182/113 |
| D430,789 | S | 9/2000 | Opperman |  |
| 6,186,452 | B1 | 2/2001 | Zearbaugh et al. |  |
| 6,220,557 | B1 * | 4/2001 | Ziaylek et al. | 248/316.1 |
| 6,250,847 | B1 | 6/2001 | Bingham, Jr. |  |
| 6,848,679 | B2 | 2/2005 | Higgs et al. |  |
| 6,976,660 | B2 | 12/2005 | Lapointe et al. |  |
| 7,498,511 | B1 | 3/2009 | Brown et al. |  |
| 8,240,939 | B2 * | 8/2012 | Uttley et al. | 403/188 |
| 2004/0041141 | A1 * | 3/2004 | Cannon | 256/65.05 |

(Continued)

*Primary Examiner* — Joshua Kennedy
(74) *Attorney, Agent, or Firm* — Day Pitney LLP

(57) ABSTRACT

The present disclosure relates to a connector for toy structures and educational instruments, particularly for assembling plastic and metal components. The connector includes a circular base with apertures for securing to an expansive metal construction piece by use of screws or similar threaded fasteners. The connector further includes a passageway for receiving a second construction piece, such as a plastic construction piece. Pegs pass through aligned apertures in the walls of the passageway as well as apertures in the second construction pieces, thereby securing the second construction piece to the connector.

8 Claims, 3 Drawing Sheets

(56) References Cited

U.S. PATENT DOCUMENTS

| | | |
|---|---|---|
| 2005/0186029 A1 | 8/2005 | Jones |
| 2007/0108363 A1 | 5/2007 | Metheny |
| 2009/0242864 A1 | 10/2009 | Carney |

* cited by examiner

METAL TO PLASTIC CONNECTOR FOR TOY STRUCTURES

CROSS-REFERENCE TO RELATED APPLICATIONS

The present patent application is a continuation of and claims the benefit of priority to U.S. patent application Ser. No. 12/082,984 filed Apr. 16, 2008. The aforementioned patent application is incorporated by reference herein in its entirety.

BACKGROUND OF THE INVENTION

1. Field of the Invention

The present invention pertains to a connector for toy structures and educational instruments, particularly for assembling plastic and metal components.

2. Description of the Prior Art

In the prior art of toy structures wherein various pieces are provided for the child to assemble, typically all the pieces of a set are assembled with similar material. However, of all materials, metal is typically the best adapted for providing thin pieces of a long expanse. Plastic, however, is typically preferable for smaller pieces, such as connectors, as it is flexible and easy to manipulate safely by children.

OBJECTS AND SUMMARY OF THE INVENTION

It is therefore an object of the present invention to provide a plastic connector which is adaptable for use with larger metal pieces, particularly expansive pieces, in a toy construction set.

This and other objects are attained by providing a plastic connector with a flat base which can be screwed to the side of a first metal construction piece, and further includes a passageway of square or rectangular cross section for receiving a plastic construction piece.

DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 2:
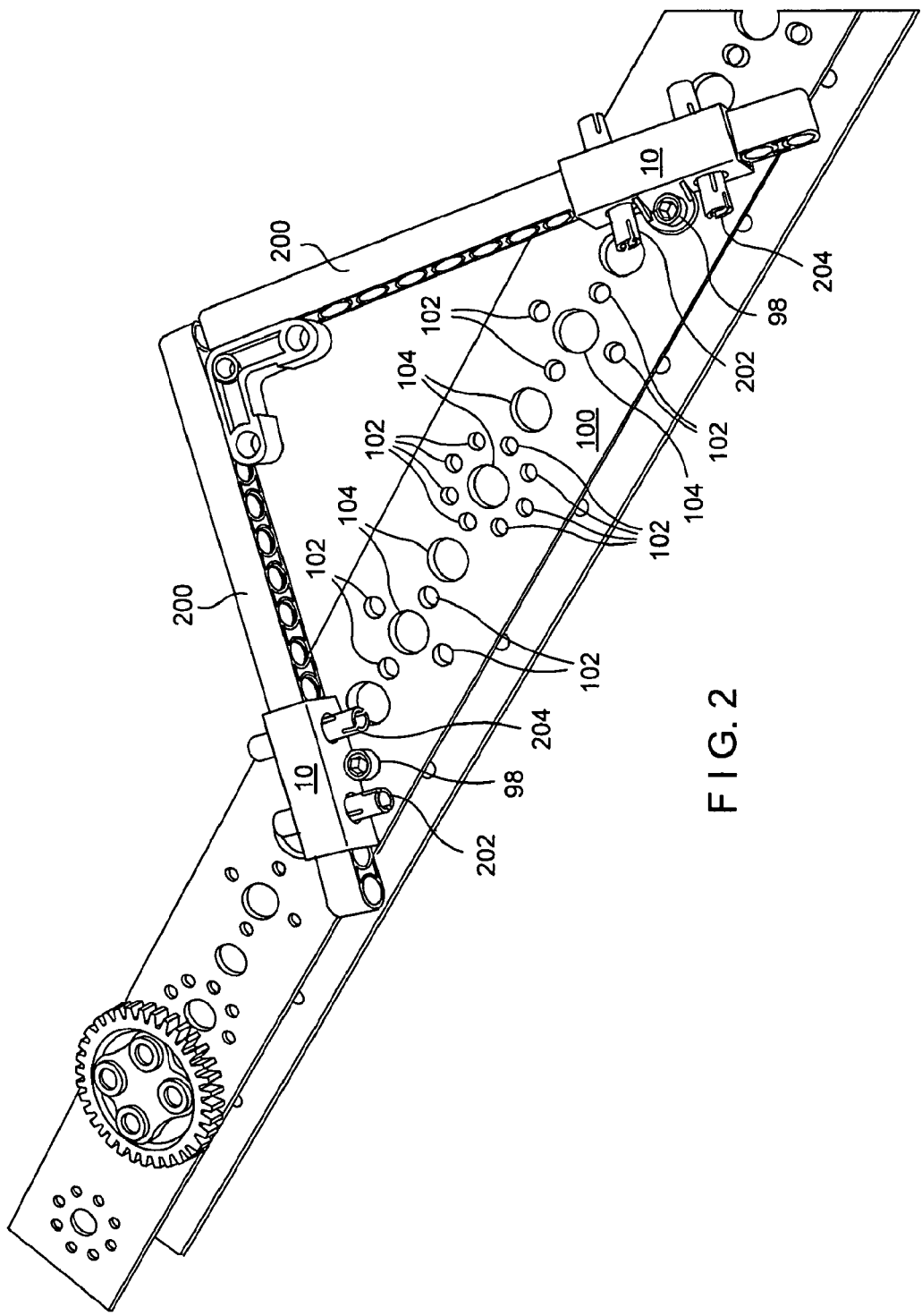
FIG. 2 is a first perspective view of an embodiment of the connector of the present invention, shown assembled with both metal and plastic pieces.
Figure 3:
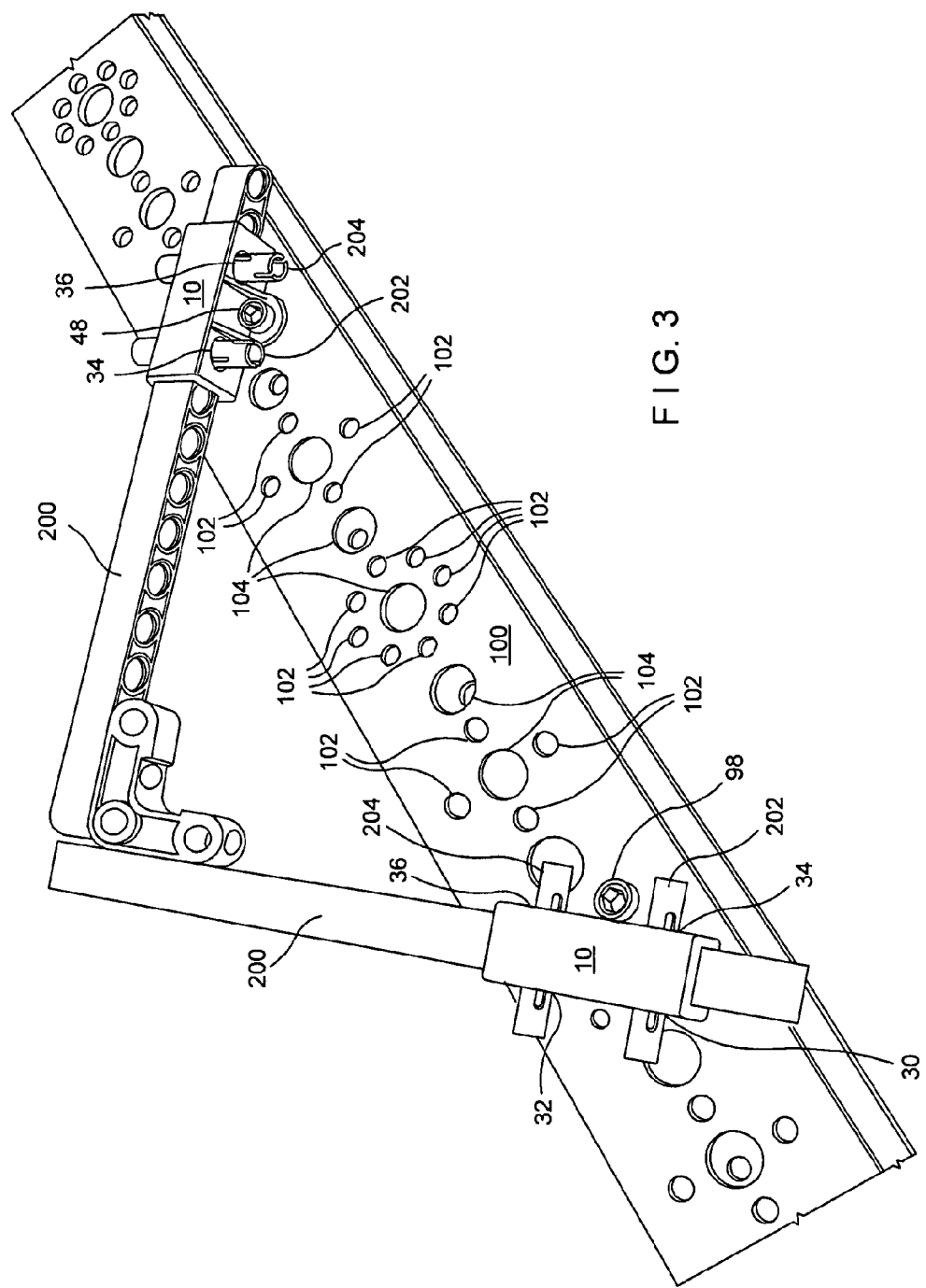
FIG. 3 is a second perspective view of an embodiment of the connector of the present invention, shown assembled with both metal and plastic pieces.

Referring now to the drawings in detail wherein like numerals indicate like elements throughout the several views, one sees the connector 10, an embodiment of the present invention. Connector 10 is typically an integral molded piece of plastic, but those skilled in the art will recognize a range of equivalents after review of this disclosure. Connector 10 includes a circular base 12 in a planar configuration with opposed apertures 14, 16 inwardly adjacent from the periphery 18 of circular base 12. Apertures 14, 16 receive threaded fasteners or similar generally cylindrical fasteners 98 (see FIGS. 2 and 3) which pass partially through apertures 14, 16 and are received by apertures 102 in a metal construction piece 100 and are captured by complementary metal fasteners (obscured from view). Therefore, the planar surface of circular base 12 abuts a wall of construction piece 100, and is co-planar therewith, as shown in FIGS. 2 and 3. Apertures 102 are positioned around central apertures 104 so as allow the user to orient the circular base 12 at different angles with respect to metal construction piece 100.

Figure 1:
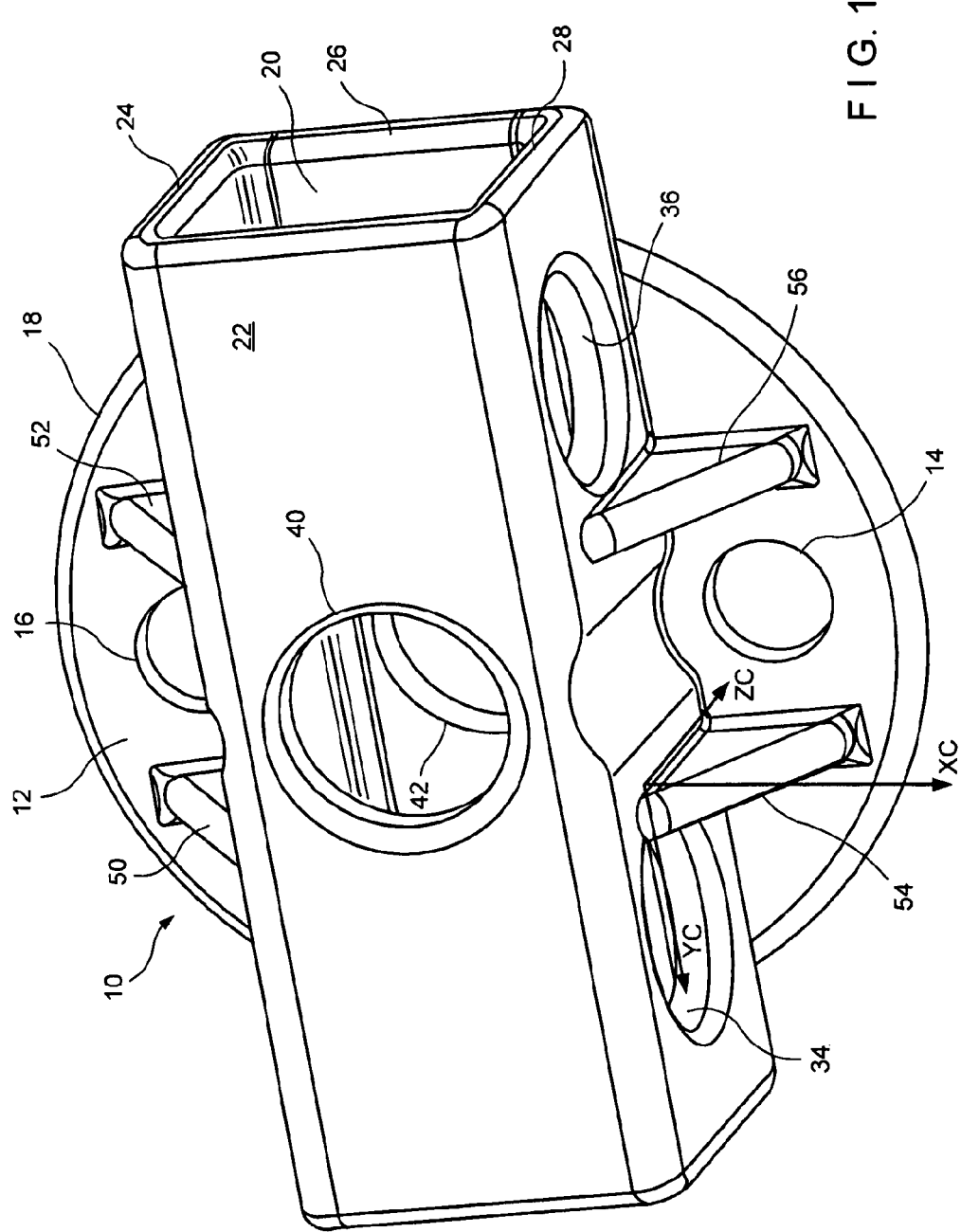
FIG. 1 is a perspective view of an embodiment of the connector of the present invention.

Connector 10 further includes a square or rectangular channel 20 bounded by walls 22, 24, 26, 28, with wall 26 being formed by a portion of circular base 12. Apertures 30, 32 (obscured from view in FIGS. 1 and 2, see FIG. 3) are formed in sidewall 24 and are aligned with respective apertures 34, 36 formed in sidewall 28. In this configuration, as shown in FIGS. 2 and 3, construction piece 200 (typically made of plastic) can pass through channel 20 and be secured therein by peg 202 passing through apertures 30, 34 and likewise through a first aperture of construction piece 200. Similarly, peg 204 can pass through apertures 32, 36 and likewise through a second aperture of construction piece 200. Walls 22, 26 further include respective aligned apertures 40, 42 which can receive pegs (not shown) which are likewise received by central apertures 104 of metal construction piece 100.

Lateral supports 50, 52 extend from circular base 12 to sidewall 24. Similarly, lateral supports 54, 56 extend from circular base 12 to sidewall 28 thereby stabilizing the sidewalls and connector 10 as a whole.

To use connector 10, the user typically places connector 10 against metal construction piece 100 and secures the connector 10 to the construction piece by passing threaded fasteners 98 through apertures 14, 16 and corresponding apertures 102 in metal construction piece 100. Threaded fastener 98 is then captured by a complementary threaded fastener (obscured from view). The user then passes construction piece 200 through channel 20 and passing pegs 202, 204 through apertures 30-36 and the corresponding apertures formed in construction piece 200. Other similar variations are possible.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A toy connector comprising:
   a) a planar injection molded plastic base with a first, central aperture defined therethrough and a plurality of secondary apertures defined radially outwardly therefrom for receiving removable fasteners for fastening the base to a coplanar metallic toy component; and
   b) a generally tubular channel having a generally rectangular cross section attached to the base, wherein a lateral side of the channel is integrally formed with the base, the channel defining a generally rectangular passage therethrough configured for receiving and retaining an elongate plastic toy component having a plurality of evenly spaced holes defined therethrough, the generally tubular channel having a plurality of holes that are configured to be in registration with the holes of the elongate plastic toy component, and further wherein a second central aperture is formed in an upper wall of the generally tubular channel that aligns with the central aperture of the base.

2. The toy connector of claim 1, wherein the base is substantially circular and defines the central aperture at its geometric center.

3. The toy connector of claim 1, further comprising a plurality of lateral supports connecting the base to the channel.

4. A toy system, comprising:
 a) The connector of claim 1;
 b) a metallic member having a planar portion with apertures attached to a planar portion of the base.

5. The toy system of claim 4, further comprising an elongate plastic toy component having a plurality of evenly spaced holes defined therethrough, the holes of the generally tubular channel being in registration with the holes of the elongate plastic toy component.

6. The toy system of claim 5, further comprising at least one peg joining the elongate plastic toy component to the channel.

7. The toy system of claim 4, further comprising at least one fastener joining the connector to the metallic member.

8. The toy system of claim 7, wherein the at least one fastener is a threaded fastener.

\* \* \* \* \*